United States Patent
Tsuji et al.

(10) Patent No.: US 10,807,628 B2
(45) Date of Patent: Oct. 20, 2020

(54) STEERING APPARATUS

(71) Applicant: AISIN SEIKI KABUSHIKI KAISHA, Kariya-shi, Aichi-ken (JP)

(72) Inventors: Haruki Tsuji, Kariya (JP); Takehiro Tabata, Kariya (JP); Takaaki Koizumi, Kariya (JP)

(73) Assignee: AISIN SEIKI KABUSHIKI KAISHA, Kariya-Sh, Aichi-Ken (JP)

( * ) Notice: Subject to any disclaimer, the term of this patent is extended or adjusted under 35 U.S.C. 154(b) by 0 days.

(21) Appl. No.: 16/666,544

(22) Filed: Oct. 29, 2019

(65) Prior Publication Data
US 2020/0156688 A1    May 21, 2020

(30) Foreign Application Priority Data

Nov. 16, 2018  (JP) ................................ 2018-215530
Nov. 16, 2018  (JP) ................................ 2018-215766

(51) Int. Cl.
*B62D 1/04*    (2006.01)
*B62D 1/06*    (2006.01)

(52) U.S. Cl.
CPC .............. *B62D 1/046* (2013.01); *B62D 1/065* (2013.01)

(58) Field of Classification Search
CPC ........ B62D 1/046; B62D 1/065; B60K 28/04; G01D 5/24
See application file for complete search history.

(56) References Cited

U.S. PATENT DOCUMENTS

| | | | | |
|---|---|---|---|---|
| 6,093,908 A | * | 7/2000 | Haag | B62D 1/065 219/204 |
| 6,441,344 B1 | * | 8/2002 | Bonn | B62D 1/065 219/202 |
| 8,803,037 B2 | * | 8/2014 | Paxton | B62D 1/065 219/202 |
| 9,248,851 B2 | * | 2/2016 | Van'tZelfde | B62D 1/046 |
| 10,124,823 B2 | * | 11/2018 | Van'tZelfde | B62D 1/046 |
| 2015/0369633 A1 | | 12/2015 | Karasawa et al. | |
| 2017/0079089 A1 | * | 3/2017 | Okazaki | G01L 1/14 |
| 2017/0282956 A1 | | 10/2017 | Odate et al. | |
| 2019/0036527 A1 | * | 1/2019 | Dolcetti | B62D 1/046 |

FOREIGN PATENT DOCUMENTS

| | | |
|---|---|---|
| JP | 2011121477 A | 6/2011 |
| JP | 2017178133 A | 10/2017 |
| JP | 2018142411 A | 9/2018 |
| WO | 2014123222 A1 | 8/2014 |
| WO | 2017183296 A1 | 10/2017 |

* cited by examiner

*Primary Examiner* — Thomas C Diaz
(74) *Attorney, Agent, or Firm* — Buchanan Ingersoll & Rooney PC

(57) ABSTRACT

A steering apparatus includes a steering structure including an outer surface, a groove portion provided on the outer surface, a surface cover covering the outer surface, and a conductive function member arranged in the groove portion along an extension direction of the groove portion.

20 Claims, 10 Drawing Sheets

Orthogonal cross section radially outer side (surface cover-side)

Orthogonal cross section radially inner side (structure-side)

Orthogonal cross section radially outer side (surface cover-side)

Orthogonal cross section radially inner side (structure-side)

STEERING APPARATUS

CROSS REFERENCE TO RELATED APPLICATIONS

This application is based on and claims priority under 35 U.S.C. § 118 to Japanese Patent Application 2018-215530 filed on Nov. 16, 2018 and Japanese Patent Application 2018-215766 filed on Nov. 16, 2018, the entire contents of which are incorporated herein by reference.

TECHNICAL FIELD

This disclosure generally relates to a steering apparatus.

BACKGROUND DISCUSSION

According to a conventionally known steering apparatus of a vehicle, a conductive function member is arranged at an inner side of a surface cover covering an outer surface of a steering structure defining an outer shape of the apparatus. For example, International Publication No. WO2014/123222 (which will be hereinafter referred to as Patent reference 1) and/or JP 2018-142411A (which will be hereinafter referred to as Patent reference 2) discloses a structure in which a sensor electrode of a capacitance sensor is laid on a substrate (a flexible substrate) including a film shape. Similarly, JP 2011-121477A (which will be hereinafter referred to as Patent reference 3) discloses a structure in which a heater wire is laid on a substrate including a film shape. According to the above-stated known steering apparatuses, the substrate including the film shape is attached or stuck on an outer surface of the steering structure, and accordingly the conductive function member is arranged at the inner side of the surface cover.

However, enhancement in mountability of the steering apparatus of the vehicle is an important issue, including a high-quality finish and ease of assembling of the apparatus, for example. There remains room for the enhancement in these aspects because the structures of the above-described known steering apparatuses might not satisfy the required standards.

A need thus exists for a steering apparatus which is not susceptible to the drawback mentioned above.

SUMMARY

According to an aspect of this disclosure, a steering apparatus includes a steering structure including an outer surface, a groove portion provided on the outer surface, a surface cover covering the outer surface, and a conductive function member arranged in the groove portion along an extension direction of the groove portion.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Figure 1:
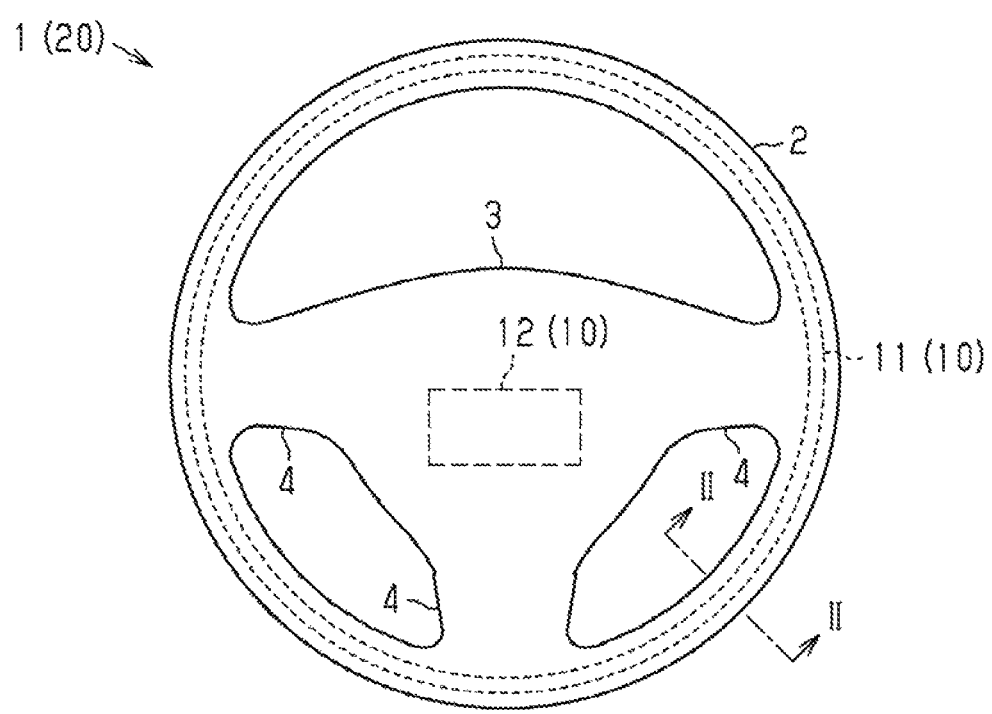
FIG. 1 is a front view of a steering of a first embodiment disclosed here.

A steering apparatus of a vehicle according to a first embodiment will be described hereunder with reference to the drawings. As illustrated in FIG. 1, a steering 1 of the first embodiment includes a rim 2 including a ring-shaped outer shape and configured to be gripped by an occupant (a driver) of a vehicle, a hub 3 connected to a steering shaft, and three pieces of spokes 4 each connecting the hub 3 to the rim 2 such that a substantial shape of a letter T is formed. A sensor electrode 11 of a capacitance sensor 10 is provided within or built into the rim 2 of the steering 1. A detection circuit 12 of the capacitance sensor 10 is provided within or built into the hub 3 of the steering 1. In the embodiment, a steering apparatus 20 that can detect a gripping state, by the driver, of the steering 1 is configured as described above.

Figure 2:
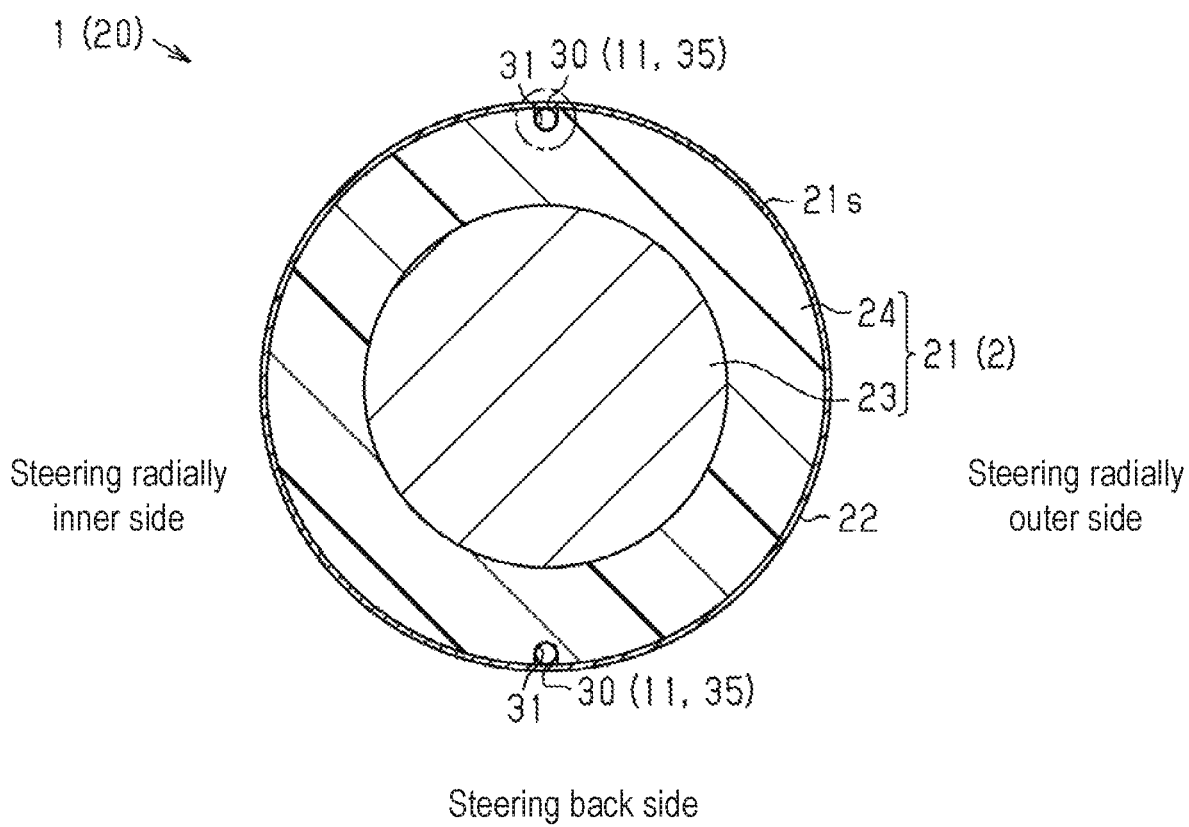
FIG. 2 is a cross-sectional view of the steering taken along line II-II in FIG. 1.

In further detail, as illustrated in FIG. 2, the steering 1 of the embodiment includes a steering structure 21 defining the outer shape of the rim 2 including the ring shape, and a surface cover 22 covering an outer surface 21s of the steering structure 21. Specifically, the steering structure 21 of the embodiment includes a steering core 23 serving as a frame of the steering structure 21 and a buffer or cushioning material 24 covering an outer contour of the steering core 23. For example, iron-based metal or ferrous metal (an iron core) is used as material of the steering core 23. For example, foamable resin including urethane is used for the buffer material 24, In the steering 1 of the embodiment, the surface cover 22 is configured by using natural leather, or synthetic leather or artificial leather which is made from resin material. According to the configuration of the steering apparatus 20 of the embodiment, a conductive function member 30 functioning as the sensor electrode 11 of the capacitance sensor 10 is arranged at an inner side of the surface cover 22 formed of non-conductive material to be arranged between the surface cover 22 and the buffer material 24 formed of non-conductive material similarly to the surface cover 22.

Figure 3:
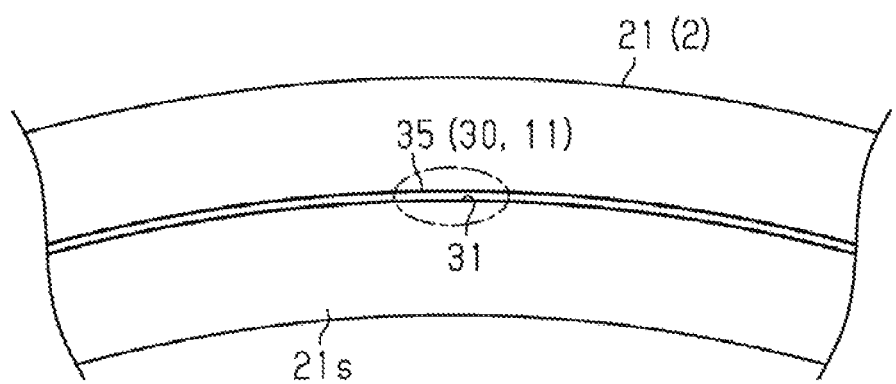
FIG. 3 is an enlarged view of a steering structure of the embodiment disclosed here.
Figure 4:
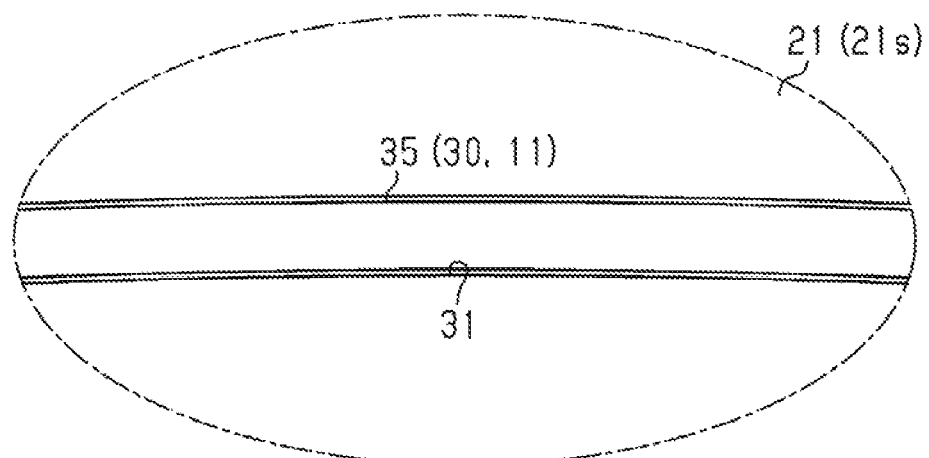
FIG. 4 is an enlarged view of a groove portion and a wire harness of the steering structure.

In further detail, as illustrated in FIGS. 2 to 4, the steering structure 21 of the embodiment includes a groove portion 31 formed on the outer surface 21s of the steering structure 21 in a recessed manner. Specifically, the steering structure 21 of the embodiment includes the groove portions 31 formed at plural positions separated from each other at an outer periphery of the steering structure 21 in an orthogonal cross section of the steering structure 21, the orthogonal cross section which is orthogonal to an extending direction (the right and left direction in FIGS. 3 and 4) of the steering structure 21, that is, in a cross section of the steering 1 illustrated in FIG. 2. In detail, the groove portions 31 are provided at the positions corresponding to a front side (on a front side of the paper surface on which FIG. 1 is drawn, refer to FIG. 1) and a back side (on a back side of the paper surface on which FIG. 1 is drawn) of the steering 1, respectively. The front side of the steering 1 corresponds to a side facing the driver who grips the steering 1, and the back side of the steering 1 corresponds to the side that is opposite to the front side. Each of the groove portions 31 extends in the extending direction of the steering structure 21, that is, each of the groove portions 31 extends to form an annular shape (an arc shape) when viewed in a direction (a direction orthogonal to the paper surface on which FIG. 1 is drawn, refer to FIG. 1) facing a ring shape of the steering structure 21. According to the configuration of the steering apparatus 20 of the embodiment, the conductive function member 30 is arranged in each of the groove portions 31 to be routed along an extension direction of the groove portion 31.

Figure 5:
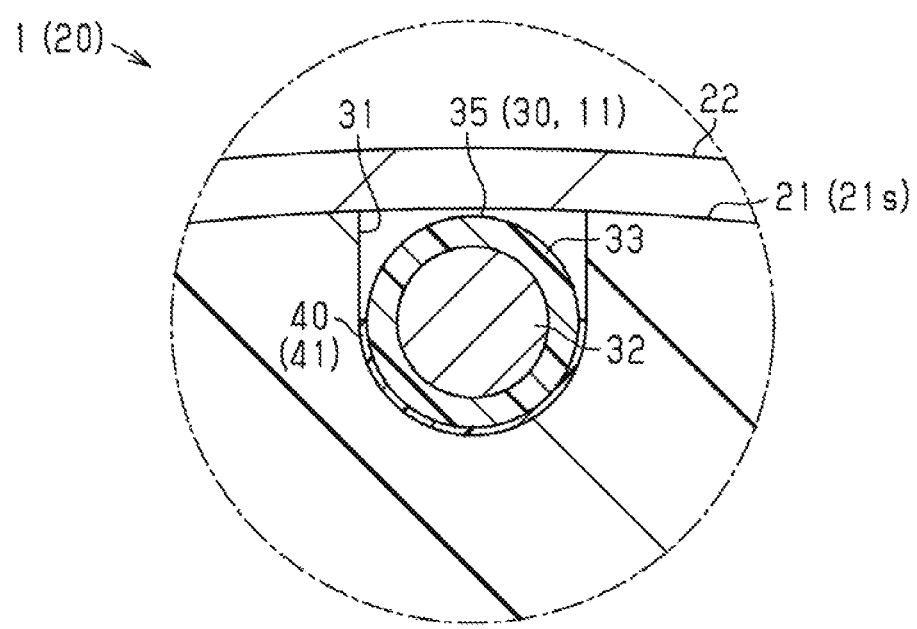
FIG. 5 is an enlarged cross-sectional view of the steering in the vicinity of the groove portion and the wire harness of the steering structure.

As illustrated in FIG. 5, as each of the conducting function members 30 of the steering apparatus 20 of the embodiment, a wire harness 35, which may be a known wire harness, including a resin layer 33 coating an outer side of an electric wire 32 is used, According to the steering apparatus 20 of the embodiment, the wire harnesses 35 function as the sensor electrodes 11 that are independent from each other, and thus the capacitance sensor 10 is configured to include two systems of detection channels.

Each of the wire harnesses 35 of the steering 1 of the embodiment is arranged along the extension direction of the corresponding groove portion 31 in a state in which adhesive 41 serving as a fixing member 40 is applied inside the groove portion 31. Thus, according to the configuration of the steering apparatus 20 of the embodiment, each of the wire harnesses 35 is fixed or secured within the corresponding groove portion 31.

Next, effects of the first embodiment will be described. (1) The steering 1 includes the steering structure 21 and the surface cover 22 covering the outer surface 21s of the steering structure 21. The groove portion 31 is provided on the outer surface 21s of the steering structure 21. The steering apparatus 20 includes the conductive function member 30 arranged in the groove portion 31 along the extension direction of the groove portion 31.

According to the above-described configuration, a high-quality finish is realized in which the occupant (the driver) of the vehicle who grips of holds the steering 1 does not easily recognize the conductive function member 30 arranged at the inner side relative to the surface cover 22. Further, the conductive function member 30 is arranged or routed along the groove portion 31, which allows an easy assembling and an accurate positioning. Consequently, mountability of the conductive function member 30 onto the steering structure 21 may be enhanced.

(2) The conductive function member 30 includes the function as the sensor electrode 11 of the capacitance sensor 10. According to the above-described configuration, the gripping state of the steering 1 by the driver can be detected with the use of the capacitance sensor 10. Further, the conductive function member 30 can be positioned easily because the conductive function member 30 is arranged along the groove portion 31, and thus a detection region of the capacitance sensor 10 can be set correctly. Consequently, a gripping determination of the steering 1 can be performed accurately.

(3) The wire harness 35 is used as the conductive function member 30, and accordingly the conductive function member 30 can be arranged and routed within the groove portion 31 more easily. By utilizing the simple configuration, costs can be reduced.

(4) The groove portion 31 extends in the extending direction of the steering structure 21. According to the above-described configuration, advantageous effect of the conductive function member 30 can be obtained in a large range along the extending direction of the steering structure 21. In particular, in a case where the conductive function member 30 is used as the sensor electrode 11 of the capacitance sensor 10, the large detection region can be set for a gripping portion (the rim 2), which is formed by the steering structure 21 and is gripped by the driver, along the extending direction of the steering structure 21. Consequently, the gripping determination of the steering 1 can be performed accurately.

(5) The steering structure 21 includes the groove portions 31 formed at the plural positions of the outer periphery of the steering structure 21 to be apart from each other when viewed in the orthogonal cross section of the steering structure 21 which is orthogonal to the extending direction of the steering structure 21. The conductive function members 30 are arranged in the groove portions 31, respectively.

According to the above-described configuration, the driver gripping the steering 1 can obtain the advantageous effect of the conductive function member 30 more appropriately. In particular, in a case where the conductive function member 30 is used as the sensor electrode 11 of the capacitance sensor 10, a hand or hands of the driver gripping the steering 1 can be detected accurately.

(6) The steering structure 21 includes the groove portions 31 provided at the front side and the back side of the steering 1, and the conductive function members 30 are arranged in the groove portions 31. That is, the driver is likely to grip the steering 1 in a state where the driver touches at least either of the front side and the back side of the steering 1. Thus, according to the above-described configuration, the advantageous effect of the conductive function member 30 can be obtained more appropriately.

(7) The wire harness 35 serving as the conductive function member 30 is arranged in the groove portion 31 in a state in which the adhesive 41 serving as the fixing member 40 is applied inside the groove portion 31, According to the above-described configuration, the wire harness 35 is fixed within the groove portion 31 so that the wire harness 35 does not protrude out of the groove portion 31 in which the wire harness 35 is arranged. Thus, the high-quality finish can be assured by which the conductive function member 30 arranged on the inner side of the surface cover 22 is not easily recognized.

The above-described embodiment can be changed or modified as follows, and be implemented. The above-described embodiment and the following variations can be combined with each other or one another for the implementation, within a range in which technical contradiction does not occur.

In the above-described embodiment, the groove portions 31 of the steering structure 21 are formed at the positions corresponding to the front side and the back side of the steering 1. However, the configuration is not limited thereto, and the number and the arrangement of the groove portions 31, in which the conductive function members 30 are arranged, can be changed arbitrarily.

Figure 6A:
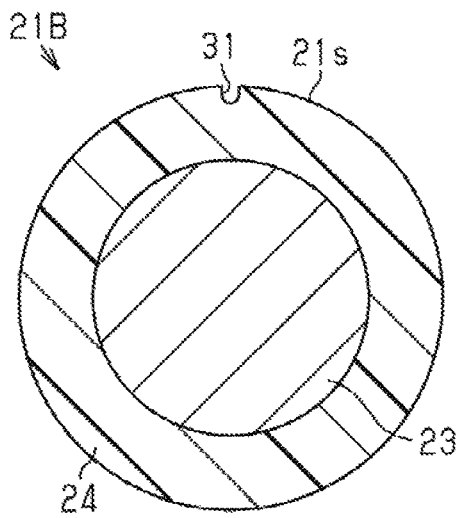
FIG. 6A is a cross-sectional view of the steering structure, which illustrates another example of an arrangement of the groove portions.
Figure 6B:
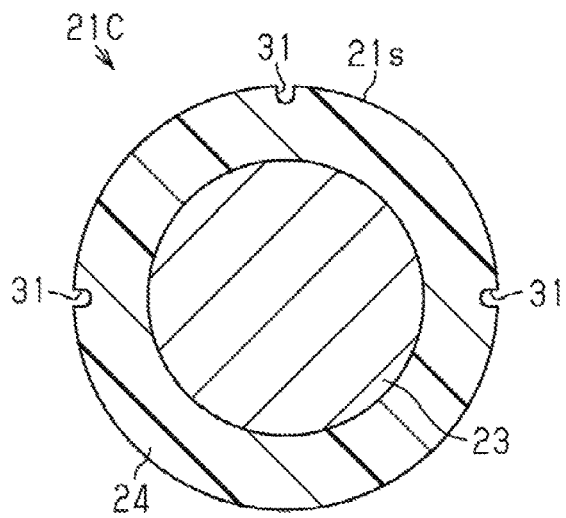
FIG. 6B is a cross-sectional view of the steering structure, which illustrates still another example of the arrangement of the groove portion.

For example, a steering structure 218 may be configured to include the single groove portion 31 as illustrated in FIG. 6A. For example, a steering structure 21C may be configured to include three of the groove portions 31 as illustrated in FIG. 68, or to include four or more of the groove portions 31. For example, the groove portions 31 may be provided at positions corresponding to a radially inner side (the left side in FIGS. 6A and 68) of the steering 1 and/or at a radially outer side (the right side in FIGS. 6A and 6B) of the steering 1.

Figure 7A:
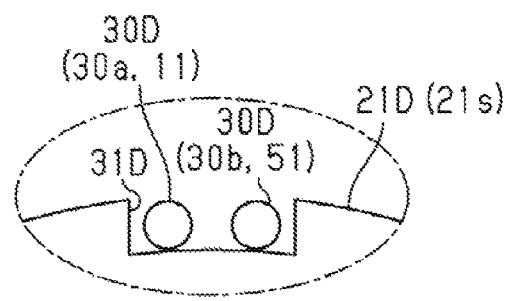
FIG. 7A is an enlarged cross-sectional view of the steering structure, which illustrates another example of a configuration of the groove portion.

For example, a steering structure 21D illustrated in FIG. 7A and a steering structure 21E illustrated in FIG. 78 may include a groove portion 31D and a groove portion 31E, respectively, both of which are formed to be wide in a circumferential direction. The shape and configuration of the groove portion 31 also can be arbitrarily changed to include a triangular cross section, for example.

Figure 8A:
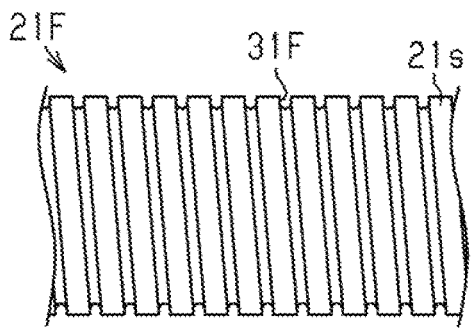
FIG. 8A is an enlarged view of the steering structure, which illustrates another example of the configuration of the groove portions.
Figure 8B:
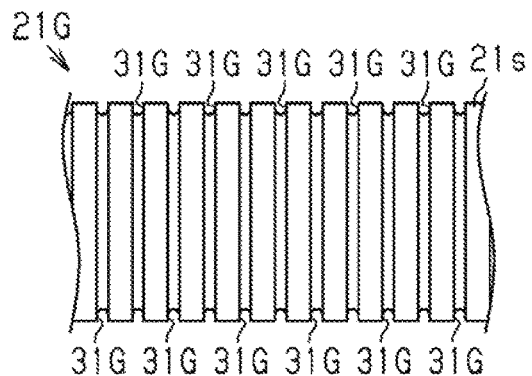
FIG. 8B is an enlarged view of the steering structure which illustrates still another example of the configuration of the groove portions.

For example, as illustrated in FIG. 8A, a steering structure 21F may be provided with a groove portion 31F extending in a spiral or helical manner towards the extending direction (the right and left direction in FIG. 8A) of the steering structure 21F, For example, as illustrated in FIG. 8B, a steering structure 21G may include plural groove portions 31G each extending in the circumferential direction are arranged in the extending direction of the steering structure 21G. Also in a configuration that includes the groove portion 31 extending in the extending direction of the steering structure 21G, a section in which the groove portion 31 is not formed in the extending direction of the steering structure 21 may be provided.

As illustrated in FIG. 7A, plural conductive function members 30D may be arranged in the groove portion 310, that is, in the single groove portion. For example, the two conductive function members 30D (the conductive function members 30a and 30b) are arranged in the groove portion 31D, and one (the conductive function member 30a) of the two conductive function members 30D may function as the sensor electrode 11 of the capacitance sensor 10 and the other (the conductive function member 30b) of the two conductive function members 30D may function as a heating element (a heater wire) 51. Thus, the gripping portion (the rim 2) of the steering 1 configured by the steering structure 21 can be heated effectively.

Each of the conductive function members 30D (the conductive function members 30a and 30b) may function as an independent sensor electrode 11 such that the sensor electrodes 11 are independent from each other. Further, three or more conductive function members 300 may be arranged in the single groove portion 310.

In the configuration in which the single conductive function member 30 is arranged in the single groove portion 31D as in the above-described embodiment, the conductive function member 30 may function as the heating element 51.

Figure 7B:
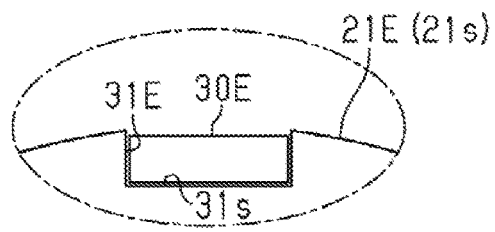
FIG. 7B is an enlarged cross-sectional view of the steering structure, which illustrates still another example of the configuration of the groove portion.

In the above-described embodiment, the wire harness 35 is used as the conductive function member 30, however, the disclosure is not limited thereto and a shape and configuration of the conductive function member 30 may be changed arbitrarily. For example, as illustrated in FIG. 7B, a conductive function member 30E may include an outer shape formed in a plate shape including a substantially rectangular cross section. In this case, a bottom surface 31s of the groove portion 31E may be formed to be flat so as to fit or meet the shape of the conductive function member 30E.

In the above-described embodiment, the wire harness 35 serving as the conductive function member 30 is arranged in the groove portion 31 in a state in which the adhesive 41 serving as the fixing member 40 is applied at the inner side the groove portion 31. However, the disclosure is not limited thereto and the configuration of the fixing member 40 may be arbitrarily changed to, for example, an adhesive tape and/or a clip, as long as the fixing member 40 is arranged in the groove portion 31 together with the conductive function member 30 and fixes or secures the conductive function member 30 at the inside of the groove portion 31.

Figure 9:
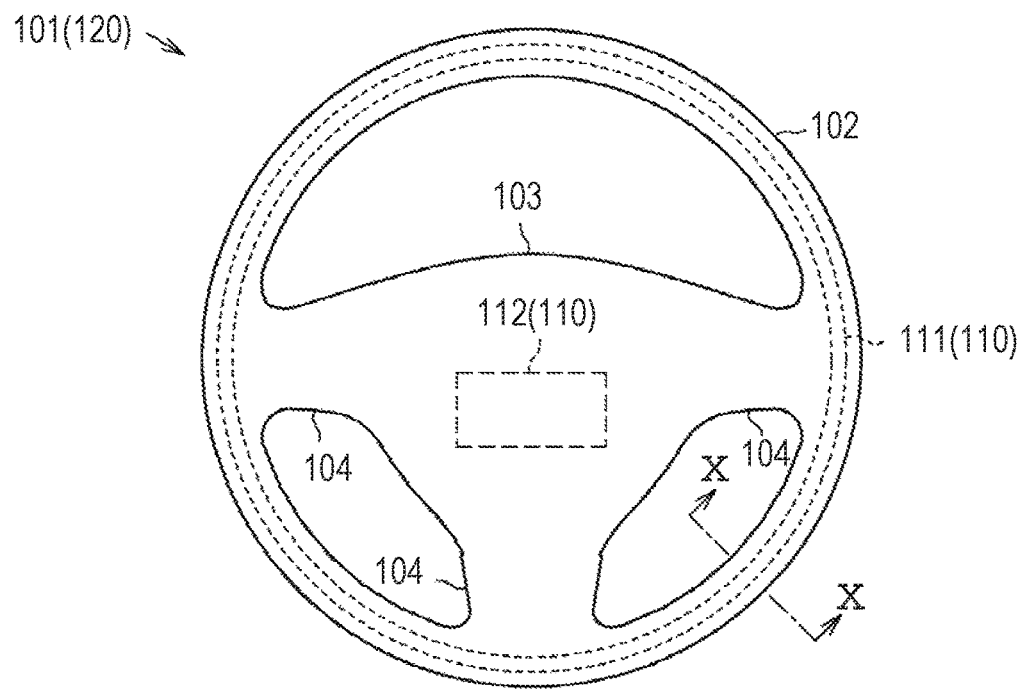
FIG. 9 is a front view of the steering of a second embodiment disclosed here.

A second embodiment of the steering apparatus of a vehicle will be described hereunder with reference to the drawings. As illustrated in FIG. 9, a steering 101 of the second embodiment includes a rim 102 including a ring-shaped outer shape and configured to be gripped by the occupant (driver) of the vehicle, a hub 103 connected to a steering shaft, and three pieces of spokes 104 each connecting the hub 103 to the rim 102 such that a substantial shape of a letter T is formed. A sensor electrode 111 of a capacitance sensor 110 is provided within or built into the rim 102 of the steering 101. A detection circuit 112 of the capacitance sensor 110 is provided within or built into the hub 103 of the steering 101 of the embodiment. Thus, in the embodiment, a steering apparatus 120 that can detect the gripping state, by the driver, of the steering 101 is configured as described above.

Figure 10:
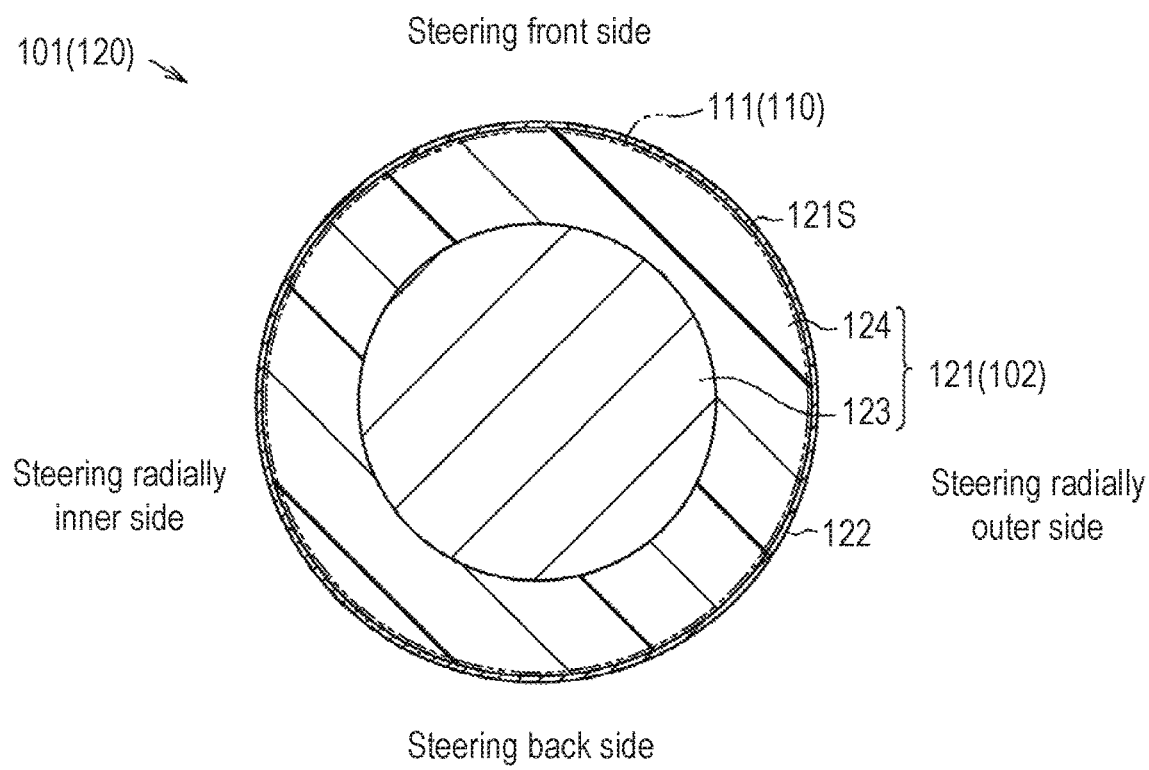
FIG. 10 is a cross-sectional view of the steering of the second embodiment which is taken along line X-X in FIG. 9.

In further detail, as illustrated in FIG. 10, the steering 101 of the second embodiment includes a steering structure 121 defining the outer shape of the rim 102 including the ring shape, and a surface cover 122 covering an outer surface 121s of the steering structure 121. Specifically, the steering structure 121 of the embodiment includes a steering core 123 serving as a frame of the steering structure 121 and a buffer or cushioning material 124 covering an outer contour of the steering core 123. For example, iron-based metal or ferrous metal (an iron core) is used as material of the steering core 123. For example, foamable resin including urethane is used as the buffer material 124, In the steering 101 of the embodiment, the surface cover 122 is configured by using natural leather, or synthetic leather or artificial leather which is made from resin material. According to the configuration of the steering apparatus 120 of the embodiment, the sensor electrode 111 of the capacitance sensor 110 is arranged at an inner side of the surface cover 122 formed of non-conductive material so as to be arranged between the surface cover 122 and the buffer material 124 formed of non-conductive material similarly to the surface cover 122.

Figure 11:
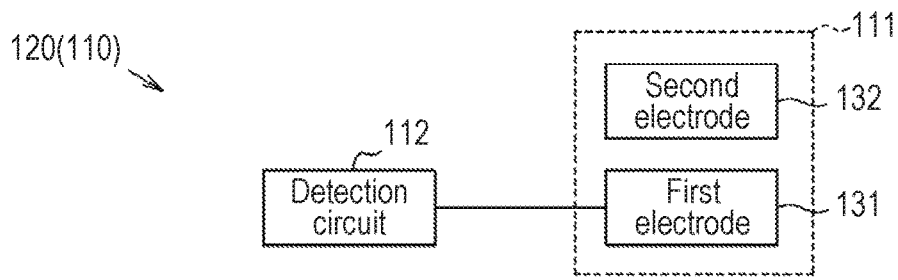
FIG. 11 is a block diagram illustrating a schematic configuration of a steering apparatus of the second embodiment.

As illustrated in FIG. 11, according to the steering apparatus 120 of the second embodiment, the sensor electrode 111 of the capacitance sensor 110 includes a first electrode 131 connected to the detection circuit 112, and a second electrode 132 provided to be disconnected from the detection circuit 112 and be independent from the first electrode 131. The second electrode 132 is configured to be electrostatically connected to the first electrode 131. That is, the second electrode 132 is arranged in the vicinity of the first electrode 131, thereby to establish electrostatic capacitive coupling with the first electrode 131. Thus, the steering apparatus 120 of the embodiment includes the configuration which accurately detects the gripping state, by the driver, of the steering 101.

Figure 12:
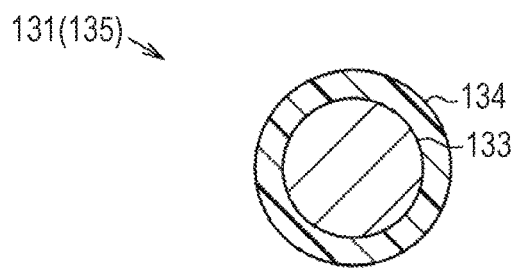
FIG. 12 is a cross-sectional view of a wire harness of the second embodiment.
Figure 13:
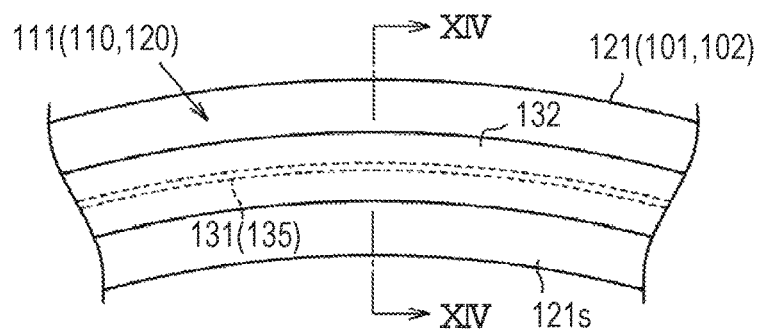
FIG. 13 is an enlarged view of a capacitance sensor electrodes arranged at the steering structure of the second embodiment.

In further detail, as illustrated in FIGS. 12 and 13, as the first electrode 131 of the second embodiment, a wire harness 135, which may be a known wire harness, including a resin layer 134 coating an outer side of an electric wire 133 is used. The second electrode 132 of the embodiment includes a substantially elongated plate shape including flexibility. In the steering apparatus 120 of the second embodiment, the second electrode 132 is configured by using metallic foil. The steering apparatus 120 includes a configuration in which the first electrode 131 and the second electrode 132 are arranged in an extending direction (the right and left direction in FIG. 13) of the steering 101, that is, the first electrode 131 and the second electrode 132 are arranged to form an annular shape (an arc shape) when viewed in a direction (a direction orthogonal to the paper surface on which FIG. 9 is drawn, refer to FIG. 9) facing a ring shape of the steering 101.

Figure 14:
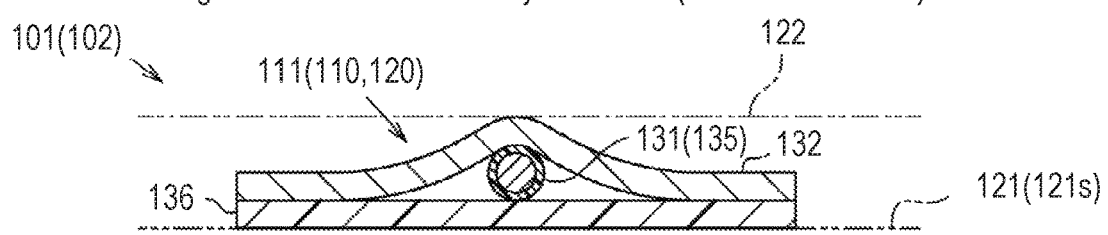
FIG. 14 is a cross-sectional view of the capacitance sensor electrodes arranged at the steering structure of the second embodiment, which is taken along line XIV-XIV in FIG. 13.

Specifically, as illustrated in FIG. 14, the first electrode 131 and the second electrode 132 of the steering 101 of the embodiment are fixed to the outer surface 121s of the steering structure 121 with the use of a double-sided tape 135. The first electrode 131 is fixed in a state of being sandwiched between the double-sided tape 136 and the second electrode 132 adhered to the outer surface 121s to be laid along the outer surface 121s with adhesive force of the double-sided tape 136.

That is, the sensor electrode 111 of the capacitance sensor 110 of the second embodiment is fixed to the outer surface 121s of the steering structure 121 in a state where the first electrode 131 is arranged at a radially inner side (the lower side in FIG. 14) relative to the second electrode 132 when viewed in an orthogonal cross section of the steering 101 (the rim 102) which is orthogonal to the extending direction of the steering 101, that is, in the cross section of the steering 10 illustrated in FIG. 10. The surface cover 122 of the steering 101 is attached to the steering structure 121 in a state where the first electrode 131 and the second electrode 132, both of which configure the sensor electrode 111 of the capacitance sensor 110, are arranged to be overlapped with each other in the radial direction of the orthogonal cross section. Thus, the steering apparatus 120 includes the configuration in which the first electrode 131 and the second electrode 132 are arranged at the inner side of the surface cover 122.

Next, effects of the second embodiment will be described. (1) The steering apparatus 120 includes the sensor electrode 111 of the capacitance sensor 110 arranged at the steering 101 of the vehicle. The sensor electrode 111 of the capacitance sensor 110 is configured by including the first electrode 131 connected to the detection circuit 112, and the second electrode 132 disconnected from the detection circuit 112, being independent from the first electrode 131 and being electrostatically connected to the first electrode 131.

That is, a high detection performance can be assured by using the electrostatic capacitive connection (the electrostatic capacitance coupling). In particular, when compared with a configuration of a known technique in which a sensor electrode of a capacitance sensor, the sensor electrode which includes a linear shape, is arranged in a zigzag manner, the present disclosure is advantageous in that stray capacitance or parasitic capacitance generated between the lines can be reduced. The shape and configuration of the sensor electrode 111 of the capacitance sensor 110, particularly the shape of the first electrode 131, can be simplified and an assembling performance relative to the steering 101 can be enhanced. Consequently, the high detection performance can be assured and the costs can be reduced.

(2) The first electrode 131 and the second electrode 132 are arranged to be overlapped with each other in the radial direction of the orthogonal cross section that is orthogonal to the extending direction of the steering 101 (the rim 102 of the steering 101) including the ring shape. That is, a detection object or an object to be detected by the sensor electrode 111 of the capacitance sensor 110 provided at the steering 101, including, for example, a hand or hands of the driver, becomes in contact and out of contact with the steering 101 in the radial direction of the above-described orthogonal cross-section, Consequently, even higher detection performance can be assured according to the above-described configuration.

(3) The sensor electrode 111 of the capacitance sensor 110 is arranged at the inner side of the surface cover 122 provided at the steering 101. Thus, a high quality design or appearance can be assured. (4) The wire harness 135 is used as the first electrode 131. Thus, the assembling performance relative to the steering 101 can be enhanced. By taking advantage of the simple configuration, the costs can be reduced. Compared to a case in which the first electrode 131 and the second electrode 132 include respective plate-shaped outer shapes which are parallel to each other, the present disclosure is advantageous in that the parasitic capacitance occurring between the lines can be reduced.

(5) The second electrode 132 is formed with the use of the metallic foil. That is, the performance of assembling the second electrode 132 onto the steering 101 is enhanced as the second electrode 132 is formed in the plate shape including the flexibility. Accordingly, the costs can be reduced by taking advantage of the simple configuration.

A third embodiment of the steering apparatus of a vehicle will be described hereunder with reference to the drawings. For convenience of the explanation, the identical numerical designations are given to the structures and/or configurations that are similar to the second embodiment, and the explanation thereof will be omitted.

Figure 15:
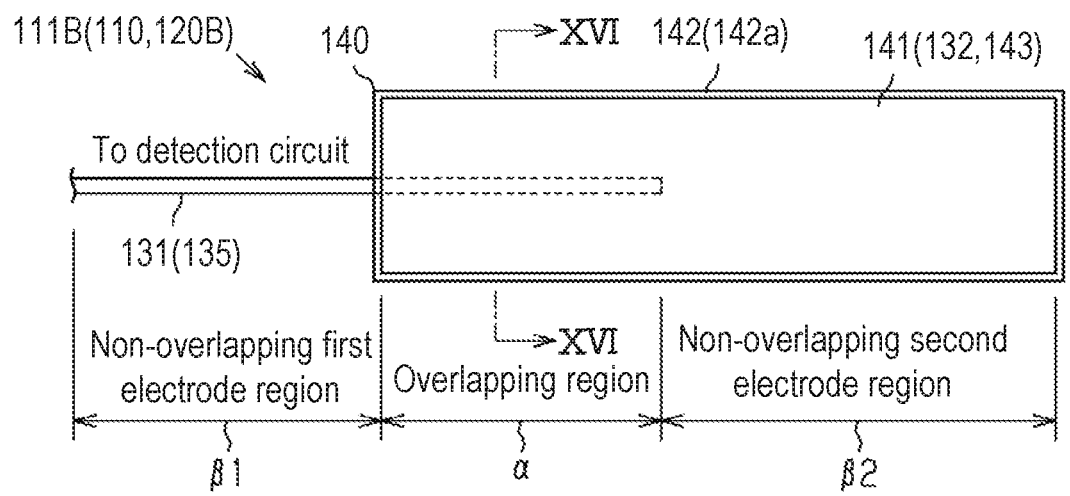
FIG. 15 is a plan view of the capacitance sensor electrodes of a third embodiment.
Figure 16:
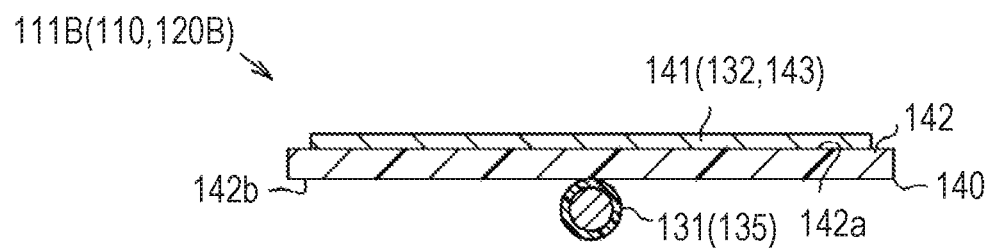
FIG. 16 is a cross-sectional view of the capacitance sensor electrodes of the third embodiment, which is taken along line XVI-XVI in FIG. 15.

As illustrated in FIGS. 15 and 16, a steering apparatus 120B of the third embodiment differs from the steering apparatus 120 of the above-described second embodiment in a configuration of a sensor electrode 111B (111) of the capacitance sensor 110, specifically, in a configuration of the second electrode 132 of the sensor electrode 111B.

In detail, the sensor electrode 111B of the capacitance sensor 110 of the third embodiment includes a sensor electrode substrate 140 including flexibility. The steering apparatus 120B of the embodiment includes a configuration in which a wire layer 141 formed on the sensor electrode substrate 140 functions as the second electrode 132.

Specifically, the sensor electrode substrate 140 of the embodiment includes a base material 142 including a film shape formed in an elongated substantially rectangular shape. The sensor electrode substrate 140 includes printed wiring 143 corresponding to the wire layer 141. The printed wiring 143 is provided on a side of a first surface 142a of the base material 142 made of non-conductive material. According to the sensor electrode substrate 140 of the embodiment, the printed wiring 143 corresponds to an entire-surface wiring including a substantially plate shape. In the steering apparatus 1208 of the embodiment, the wire harness 135 configuring the first electrode 131 is arranged at a position corresponding to a side of a second surface 142b of the base material 142, relative to the sensor electrode substrate 140.

In more detail, according to the steering apparatus 120B of the embodiment, the wire harness 135 configuring the sensor electrode 111B of the capacitance sensor 110 and the sensor electrode substrate 140 are arranged along the extending direction (the right and left direction in FIG. 15) of the steering 101 (the rim 102 of the steering 101) including the ring shape. The sensor electrode 111B of the capacitance sensor 110 of the embodiment includes an overlapping region α in which the wire layer 141, which functions as the second electrode 132, of the sensor electrode 111B of the capacitance sensor 110 overlaps with the wire harness 135 functioning as the first electrode 131 in the radial direction (the up and down direction in FIG. 16) of the orthogonal cross section that is orthogonal to the extending direction of the steering 101.

Specifically, also in the third embodiment, the sensor electrode 111B of the capacitance sensor 110 includes the configuration in which the first electrode 131 is arranged at the radially inner side (the lower side in FIG. 16) relative to the second electrode 132. Further, the sensor electrode 111B of the capacitance sensor 110 of the embodiment includes the configuration in which the first electrode 131 and the second electrode 132 which extend in the extending direction of the steering 101 are arranged to be partially overlapped with each other. According to the configuration of the sensor electrode 111B of the capacitance sensor 110 of the embodiment, a non-overlapping first electrode region β1 in which the first electrode 131 does not overlap with the second electrode 132 is set at the first electrode 131, and a non-overlapping second electrode region β2 in which the second electrode 132 does not overlap with the first electrode 131 is set at the second electrode 132.

By applying the configuration of the third embodiment, effects similar to the effects of the above-described second embodiment are obtained. By applying the configuration in which the first electrode 131 and the second electrode 132 partially overlap with each other, a portion in which detection sensitivity is high and a portion in which the detection sensitivity is low can be set easily. That is, even in the non-overlapping second electrode region β2 in which the second electrode 132 does not overlap with the first electrode 131, the high detection sensitivity is assured due to the effect of the electrostatic capacitive coupling similarly to the overlapping region α. In the non-overlapping first electrode region β1 in which the first electrode 131 does not overlap with the second electrode 132, the detection sensitivity can be relatively reduced. Thus, a highly accurate detection can be performed wherein the portion in which the second electrode 132 is arranged is a range of the detection. Further, by shortening the first electrode 131, the configuration can be simplified even more.

By applying the configuration in which the printed wiring 143 is formed on the base material 142 including the film shape, the assembling performance relative to the steering 101 is enhanced. Thus, the costs can be reduced.

A fourth embodiment of the steering apparatus of a vehicle will be described hereunder with reference to the drawings. For convenience of the explanation, the identical numerical designations are given to the structures and/or configurations that are similar to the above-described second embodiment, and the explanation thereof will be omitted.

Figure 17:
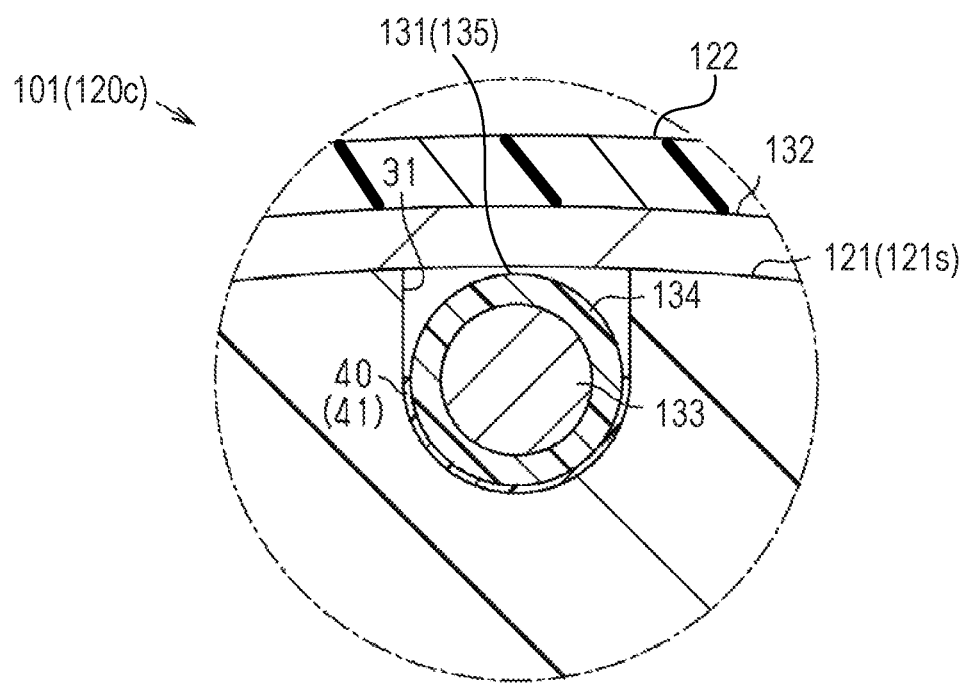
FIG. 17 is an enlarged cross-sectional view of the steering in the vicinity of the groove portion and the wire harness of the steering structure of a fourth embodiment disclosed here.
Figure 18:
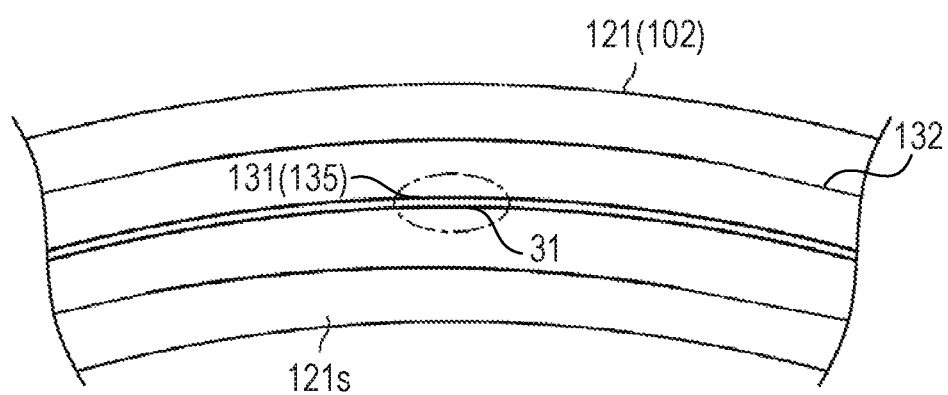
FIG. 18 is an enlarged view of the steering structure of the fourth embodiment.

As illustrated in FIGS. 17 and 18, a steering apparatus 120C of the fourth embodiment differs from the steering apparatus 120 of the second embodiment in that the steering structure 121 includes the groove portion 31 formed in a recessed manner on the outer surface 121s of the steering structure 121.

The groove portion 31 of the fourth embodiment includes the same configuration of the groove portion 31 described in the first embodiment, and therefore the explanation thereof will be omitted. According to the steering apparatus 120C of the fourth embodiment, the first electrode 131 (the wire harness 135) is arranged in the groove portion 31 along the extension direction of the groove portion 31. The first electrode 131 is arranged in the groove portion 31 along the extension direction of the groove portion 31 in a state in which the adhesive 41 serving as the fixing member 40 is applied inside the groove portion 31. Thus, according to the configuration of the steering apparatus 120C of the embodiment, the first electrode 131 is fixed or secured within the groove portion 31.

The second electrode 132 is provided at the outer surface 121s of the steering structure 121 in a manner that the second electrode 132 covers the first electrode 131 fixed to the groove portion 31. The steering apparatus 120C of the embodiment includes the surface cover 122, and the surface cover 122 covers the second electrode 132 and the outer surface 121s of the steering structure 121.

By applying the configuration of the fourth embodiment, effects similar to the effects of the above-described first and second embodiments are obtained.

The above-described embodiments can be changed or modified as follows, and be implemented. The above-described embodiments and the following variations can be combined with each other or one another for the implementation, within a range in which technical contradiction does not occur.

In the above-described embodiments, the wire harness 135, which may be a known wire harness, including the resin layer 134 coating the outer side of the electric wire 133 is used as the first electrode 131. However, the configuration of the first electrode 131 may be changed arbitrarily as long as the electrostatic connection of the first electrode 131 and the second electrode 132 to each other is assured, while the independency of the first electrode 131 and the second electrode 132 from each other is also assured, that is, the state in which the first electrode 131 and the second electrode 132 are disconnected from each other is secured. For example, an electric wire which does not include the coating layer or covering layer may be used. The shape of the first electrode 131 may be also changed arbitrarily and, for example, the first electrode 131 may include a plate-shaped outer shape. The shape of the second electrode 132 may be also changed arbitrarily. Further, the electrodes are not limited to metal, and may be made of conductive material that can electrostatically connectable to each other, including, for example, conductive resin and/or coating material.

In the above-described embodiments, the first electrode 131 is arranged at the radially inner side relative to the second electrode 132 in the orthogonal cross section that is orthogonal to the extending direction of the steering 101, however, the first electrode 131 may be arranged at the radially outer side relative to the second electrode 132. The arrangement of the first electrode 131 and the second electrode 132 may be arbitrarily changed as long as the electrostatically connected state of the first electrode 131 and the second electrode 132 to each other is secured. For example, the first electrode 131 may be arranged to surround the second electrode 132, for example, to surround a periphery of the second electrode 132.

In the above-described embodiments, in the above-described embodiments, the first electrode 131 and the second electrode 132 are arranged between the surface cover 122 and the buffer material 124 forming the steering structure 121. However, the configuration is not limited thereto, and at least one of the first electrode 131 and the second electrode 132 may be buried in the non-conductive material (the buffer material 124). At least one of the first electrode 131 and the second electrode 132 may be arranged at the outer side of the surface cover 122.

In the above-described second embodiment, the first electrode 131 and the second electrode 132 are fixed to the outer surface 121s of the steering structure 121 with the use of the double-sided tape 136. Accordingly, the first electrode 131 is fixed in a state of being sandwiched between or held between the double-sided tape 136 and the second electrode 132 adhered to the outer surface 121s of the steering structure 121 to be placed along the outer surface 121s due to the adhesive force of the double-sided tape 136.

Figure 19:
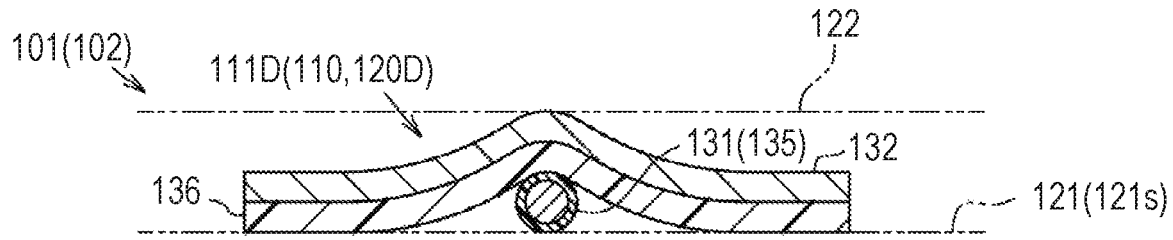
FIG. 19 is a cross-sectional view illustrating another example of the capacitance sensor electrodes.

However, the configuration is not limited thereto and as illustrated in FIG. 19, a sensor electrode 111D of the capacitance sensor 110 of a steering apparatus 120D may include a configuration in which the double-sided tape 136 is adhered to the outer surface 121s of the steering structure 121 in a state where in which the first electrode 131 is sandwiched between the double-sided tape 136 and the outer surface 121s, and the second electrode 132 is adhered to the double-sided tape 136. The fixing structure of the first electrode 131 and the second electrode 132 may be changed arbitrarily and, for example, the first electrode 131 and the second electrode 132 may be fixed with the use of adhesive and/or a clip.

Figure 20:
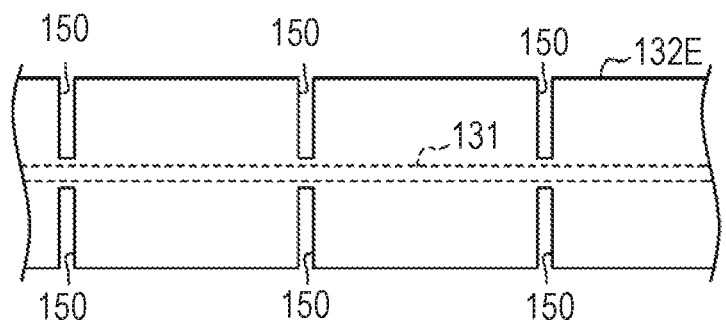
FIG. 20 is a plan view illustrating another example of a second electrode disclosed here.

As illustrated in FIG. 20, a second electrode 132E may include a slit 150 formed at a peripheral edge portion of the second electrode 132E. The slit 150 is formed in a manner that the peripheral edge portion of the second electrode 132E is cut out. By applying the above-described configuration, the second electrode 132E can be arranged or routed easily along the outer shape of the steering 101, the outer shape which includes a curved surface. Thus, the positioning of the second electrode 132E is made correctly. Consequently, the high detection performance can be assured.

Figure 21:
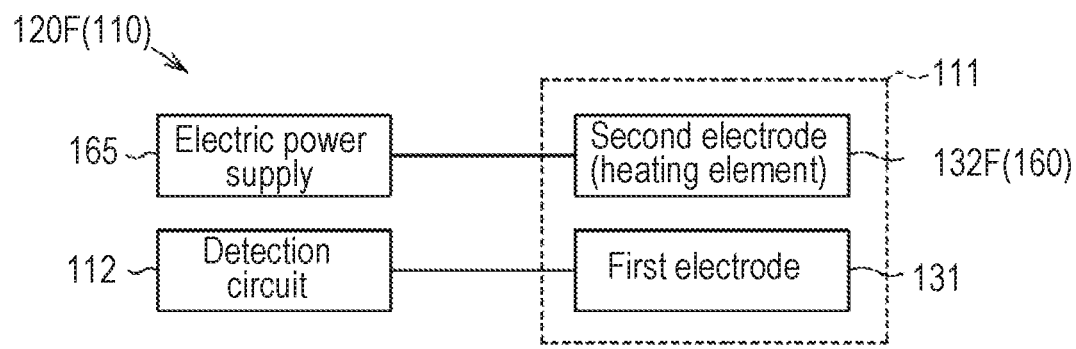
FIG. 21 is a block diagram illustrating another example of the steering apparatus disclosed here.

As illustrated in FIG. 21, a second electrode 132F of a steering apparatus 120F may include a function as a heating element (heater wire) 160. That is, the second electrode 132F of the example is connected to an electric power supply 165 of the vehicle. According to the steering apparatus 120F, when the second electrode 132F serving as the heating element 160 is electrified, the steering 101 (the rim 102 of the steering 101) to which the second electrode 132F is provided can be heated effectively.

In the above-described embodiments, the first electrode 131 and the second electrode 132 extend in the extending direction of the steering 101, however, the first electrode 131 and the second electrode 132 do not necessarily need to be arranged or routed over the entire region of the extending direction of the steering 101, Further, the sensor electrodes 111 of the plural capacitance sensors 110 may be provided at the steering 101. Further, the plural second electrodes 132 may be arranged to be overlapped with the first electrode 131. Further, the second electrode 132 may be arranged along the extending direction of the steering 101 so as to alternate with a heating element provided at the steering 101.

The arrangement of the sensor electrode 111 of the capacitance sensor 110 on the steering 101 may be changed arbitrarily. For example, the arranged position may be any of the front side, the back side, the radially inner side and the radially outer side of the steering 101 on the outer periphery of the orthogonal cross section that is orthogonal to the extending direction of the steering 101 (refer to FIG. 10).

Figure 22A:
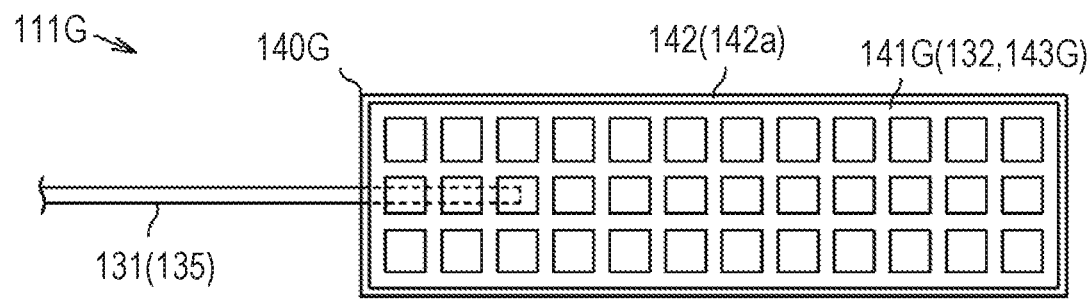
FIG. 22A is a plan view illustrating another example of the capacitance sensor electrodes disclosed here.
Figure 22B:
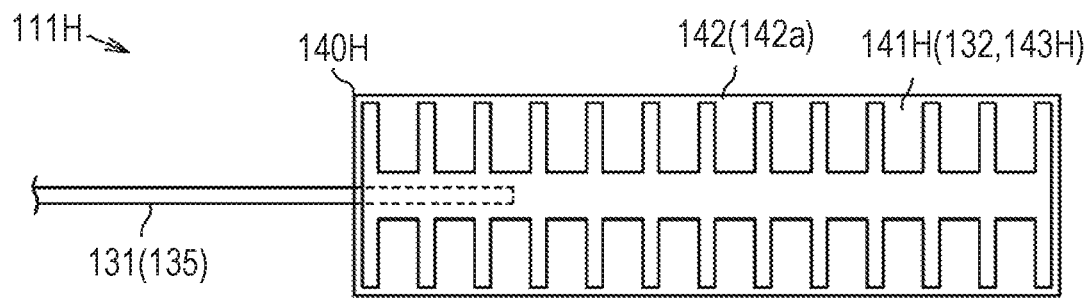
FIG. 22B is a plan view illustrating still another example of the capacitance sensor electrodes disclosed here.

In the above-described third embodiment, the wire layer 141 (the printed wiring 143), which functions as the second electrode 132, of the sensor electrode substrate 140 is the entire-surface wiring including the substantially plate shape, however, the configuration is not limited thereto. For example, as in a sensor electrode substrate 140G of a sensor electrode 111E illustrated in FIG. 22A, a wire layer 141G serving as the second electrode 132 may be a printed wiring 143G including a grid pattern. For example, as in a sensor electrode substrate 140H of a sensor electrode 111H illustrated in FIG. 22B, a wire layer 141H may be a printed wiring 143H including a comb-teeth configuration. Further, as in a sensor electrode substrate 140I of a sensor electrode 111B of the capacitance sensor 110 illustrated in FIG. 22C, the shape of the wire layer 141 serving as the second electrode 132 may be changed arbitrarily. For example, a printed wiring 143I including a wide plate shape in the overlapping region α in which the printed wiring 143I overlaps with the first electrode 131 and including a grid pattern in the non-overlapping second electrode region β2.

That is, by applying the above-described configurations, the high detection performance is assured and an area of the printed wiring 143 (143G, 143H, 143I) may be suppressed or reduced, thereby reducing the costs.

Figure 22C:
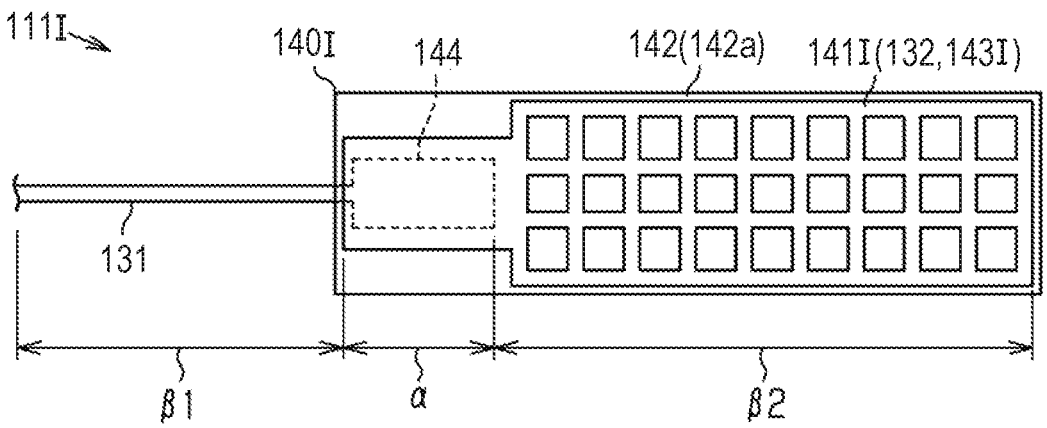
FIG. 22C is a plan view illustrating still another example of the capacitance sensor electrodes disclosed here.

As in the sensor electrode 111B of the capacitance sensor 110 illustrated in FIG. 22C, the first electrode 131 may include a plate-shaped portion 144 in the overlapping region α in which the first electrode 131 and the second electrode 132 are overlapped with each other. The plate-shaped portion 144 includes a substantially plate shape which is parallel to the second electrode 132. Thus, the first electrode 131 and the second electrode 132 can be made to be electrostatically connected to or coupled with each other more effectively.

In this case, the first electrode 131 may include the plate-shaped portion 144 at least in the overlapping region α in which the first electrode 131 overlaps with the second electrode 132. That is, part of the plate-shaped portion 144 may be arranged in the overlapping region α. Further, part of the first electrode 131, the part which is arranged in the overlapping region α, may be the plate-shaped portion 144. Further, for example, the first electrode 131 may be entirely formed in the plate shape, and the above-described plate-shaped portion 144 may be provided at a distal end of the wire harness 135. Also in this case, the shape and configuration of the second electrode 132 may be changed arbitrarily.

The sensor electrode substrate 140 may include other shape than the plate shape. For example, the sensor electrode substrate 140 may include a curved shape made to conform to the outer shape of the steering in advance, including, for example, the shape of the outer periphery of the above-described orthogonal cross section. Further, for example, a configuration may be applicable in which a protruding portion is provided on one of the outer surface 121s of the steering structure 121 and the base material 142 of the sensor electrode substrate 140, and a recessed portion is provided on the other, and the positioning is performed with the use of the protruding portion and the recessed portion. Further, by fitting the sensor electrode substrate 140 into a recess-and-protrusion configuration (a slip prevention, for example) provided at the steering 101, the positioning may also be performed.

In the above-described third embodiment, the overlapping region α is provided in which the wire layer 141, which serves as the second electrode 132, of the sensor electrode 1113 of the capacitance sensor 110 is overlapped with the wire harness 135 functioning as the first electrode 131 in the radial direction (the up and down direction in FIG. 16) of the orthogonal cross section that is orthogonal to the extending direction of the steering 101. Then, the non-overlapping first electrode region 131 in which the first electrode 131 does not overlap the second electrode 132 is set at the first electrode 131. The non-overlapping second electrode region 32 in which the second electrode 132 is not overlapped with the first electrode 131 is set at the first electrode 132.

However, the configuration is not limited thereto and the overlapping region α may be set over the entire region in an extension direction of the second electrode 132. The over-lapping region α may be set over the entire region of an extension direction of the first electrode 131. Further, at least one of the above-described non-overlapping first electrode region β1 and the non-overlapping second electrode region β2 may be set at the sensor electrode 111 of the capacitance sensor 110 of the second and fourth embodiments.

In the above-described embodiments, the steering structure 21, 121 includes the steering core 23, 123 serving as the frame of the steering structure 21, 121, and the buffer material 24, 124 covering the outer contour of the steering core 12, 123. However, the steering structure 21, 121 may formed of a single material corresponding to the steering core 23, 123. In this case, the steering structure 21 itself may be non-conductive material in order to use the conductive function member 30 as the sensor electrode 11 of the capacitance sensor 10.

In the above-described embodiments, the steering 1, 101 includes the rim 2, 102 of which the outer shape includes the ring shape. Then, the occupant (the driver) of the vehicle grips the the rim 2, 102. However, the shape of the gripping portion gripped by the occupant may be changed arbitrarily to include, for example, so-called a butterfly shape, as long as the steering structure 21, 121 configures the outer shape of the steering 1, 101 including the gripping portion.

According to the aforementioned embodiments, a steering apparatus 20, 120, 1208, 120C, 1200, 120F includes a steering structure 21, 218, 21C, 21D, 21E, 21F, 21G, 121 including an outer surface 21s, 121s, a groove portion 31, 310, 31E, 31F, 31G provided on the outer surface 21s, 121s, a surface cover 22, 122 covering the outer surface 21s, 121s, and a conductive function member 30, 300, 30a, 30b, 30E arranged in the groove portion 31, 310, 31E, 31F, 31G along an extension direction of the groove portion 31, 310, 31E, 31F, 31G.

According to the above-described configuration, the high-quality finish is realized in which the occupant (the driver) of the vehicle who grips the steering in a state where the occupant touches the surface cover 22, 122 covering the outer surface 21s, 121s of the steering structure 21, 218, 21C, 210, 21E, 21F, 21G, 121 does not easily recognize the conductive function member 30, 30D, 30a, 30b, 30E arranged at the inner side of the surface cover 22, 122. Further, the conductive function member 30, 300, 30a, 30b, 30E is arranged or routed along the groove portion 31, 310, 31E, 31F, 31G, and thus the easy assembling and the accurate positioning can be obtained. Consequently, the mountability may be enhanced.

According to the aforementioned embodiments, the conductive function member 30, 30D, 30a, 30b, 30E includes a function as a sensor electrode 11, 111, 111B, 1110, 111G, 111H, 111B of a capacitance sensor 10, 110.

According to the above-described configuration, for example, the gripping state of the steering 1, 101 by the driver can be detected with the use of the capacitance sensor 10, 110. Further, the conductive function member 30, 300, 30a, 30b, 30E can be positioned easily because the conductive function member 30, 30D, 30a, 30b, 30E is arranged along the groove portion 31, 310, 31E, 31F, 31G, and thus the detection region as the capacitance sensor 10, 110 can be set correctly. Consequently, the gripping determination of the steering 1, 101 can be performed accurately.

According to the aforementioned embodiments, the conductive function member 300, 30b includes a function as a heating element 51.

According to the above-described configuration, the gripping portion of the steering 1, 101, the gripping portion which is configured by the steering structure 21, 218, 21C, 210, 21E, 21F, 21G, can be heated effectively.

According to the aforementioned embodiments, the conductive function member 30, 30D, 30a, 30b, 30E corresponds to a wire harness 35, 135.

According to the above-described configuration, the conductive function member 30, 30D, 30a, 30b, 30E can be arranged in the groove portion 31, 31D, 31E, 31F. 316 more easily, and thus, costs can be reduced by utilizing the simple configuration.

According to the aforementioned embodiments, the groove portion 31, 31D, 31E is provided to extend in an extending direction of the steering structure 21, 121.

According to the above-described configuration, the advantageous effect of the conductive function member 30, 300, 30a, 30b, 30E can be obtained in a large range along the extending direction of the steering structure 21, 121.

According to the aforementioned embodiments, the groove portion 31, 1D, 31E is provided at plural positions of the steering structure 21, 21B, 21C, 210, 21E, 21F, 21G, 121, the plural positions are at an outer periphery of an orthogonal cross section of the steering structure 21, 21B, 21C, 210, 21E, 21F, 21G, 121 and are separated from each other, and the orthogonal cross section is orthogonal to an extending direction of the steering structure 21, 21B, 21C, 121.

According to the above-described configuration, the driver gripping the steering 1, 101 can obtain the advantageous effect of the conductive function member 30, 30D. 30a, 30b, 30E more appropriately.

According to the aforementioned embodiments, the steering apparatus 20, 120, 120B, 120C, 120O, 120F includes a steering 1, 101, wherein the groove portion 31, 31D, 31E is provided at a front side and a back side of the steering 1, 101.

The driver is likely to grips the steering 1, 101 in a state where the driver touches at least either of the front side and the back side of the steering 1, 101. Thus, according to the above-described configuration, the advantageous effect of the conductive function member 30, 30D, 30a, 30b, 30E can be obtained more appropriately.

According to the aforementioned embodiments, the plural conductive function members 300, 30a, 30b are arranged in the groove portion 31D.

According to the above-described configuration, the effects of the plural conductive function members 30D, 30a, 30b can be obtained with the simple configuration.

According to the aforementioned embodiments, the steering apparatus 20, 120C includes a fixing member 40 arranged in the groove portion 31 together with the conductive function member 30 and fixing the conductive function member 30 in the groove portion 31.

According to the above-described configuration, the conductive function member 30 is fixed within the groove portion 31 so that the conductive function member 30 does not protrude out of the groove portion 31 in which the conductive function member 30 is arranged. Thus, the high-quality finish is assured in which the conductive function member 30 arranged at the inner side of the surface cover 22 is not easily recognized.

According to the aforementioned embodiments, the sensor electrode 111, 111B, 111O, 111G, 111H, 111I of the capacitance sensor 110 includes a first electrode 131 connected to a detection circuit 112, and a second electrode 132, 132E, 132F provided to be disconnected from the detection circuit 112 and to be independent from the first electrode 131, the second electrode 132, 132E, 132F configured to be electrostatically connected to the first electrode 131.

According to the above-described configuration, the high detection performance can be assured by using the electrostatic capacitive connection (the electrostatic capacitance coupling). The shape and configuration of the sensor electrode 111, 111B, 111D, 111G, 111H, 111I of the capacitance sensor 110, particularly the shape of the first electrode 131 can be simplified and the assembling performance onto the steering 101 can be enhanced. Thus, the high detection performance can be assured and the costs can be reduced.

According to the aforementioned embodiments, the first electrode 131 and the second electrode 132, 132E are arranged to overlap with each other in a radial direction of an orthogonal cross section of the steering 101, and the orthogonal cross section is orthogonal to an extending direction of the steering 101.

According to the above-described configuration, the object of the detection to be detected by the sensor electrode 111, 111B, 111O, 111G, 111H, 111I of the capacitance sensor 110 provided at the steering 101 becomes in contact and out of contact with the steering 101 in the radial direction of the above-described orthogonal cross-section, the object which includes a hand or hands of the driver, for example. Consequently, even higher detection performance can be assured according to the above-described configuration.

According to the aforementioned embodiments, a non-overlapping first electrode region 131 is set at the first electrode 131 the first electrode 131 does not overlap with the second electrode 132 in the non-overlapping first electrode region β1.

According to the above-described configuration, the portion in which the detection sensitivity is high and the portion in which the detection sensitivity is low can be set easily. In the non-overlapping first electrode region β1 in which the first electrode 131 is not overlapped with the second electrode 132, the detection sensitivity can be reduced relatively. Thus, the highly accurate detection can be performed wherein the portion in which the second electrode 132 is arranged corresponds to the range of the detection.

According to the aforementioned embodiments, a non-overlapping second electrode region β2 is set at the second electrode 132, the second electrode 132 does not overlap with the first electrode 131 in the non-overlapping second electrode region β2.

According to the above-described configuration, the high detection accuracy is assured also in the non-overlapping second electrode region β2 due to the effect of the electrostatic capacitive coupling, similarly to the region in which the first electrode 131 and the second electrode 132 overlap with each other. Accordingly, the first electrode 131 is shortened, and thus the configuration can be simplified even more.

According to the aforementioned embodiments, the first electrode 131 includes a plate-shaped portion 144 provided at least in an overlapping region α in which the first electrode 131 overlaps with the second electrode 132, the plate-shaped portion 144 is arranged to be parallel to the second electrode 132.

According to the above-described configuration, the first electrode 131 and the second electrode 132 can be electrostatically connected to or coupled with each other more effectively.

According to the aforementioned embodiments, the sensor electrode 11, 111 of the capacitance sensor 10, 110 is arranged at an inner side of the surface cover 22, 122 provided at the steering 1, 101.

According to the above-described configuration, the high quality design or appearance can be assured.

According to the aforementioned embodiments, the first electrode 131 corresponds to a wire harness 135.

According to the above-described configuration, the first electrode 131 is arranged in the groove portion 31 more easily. Then, the costs can be reduced due to the simple configuration.

According to the aforementioned embodiments, the second electrode 132 includes a plate shape including flexibility.

According to the above-described configuration, the assembling performance onto the steering 101 is enhanced. Then, the costs can be reduced by taking advantage of the simple configuration.

According to the aforementioned embodiments, the second electrode 132E includes a slit 150 corresponding to a cutout formed at a peripheral edge portion of the second electrode 132E.

According to the above-described configuration, the second electrode 132E can be arranged or routed easily along the outer shape of the steering 101, the outer shape which includes the curved surface. Further, the positioning of the second electrode 132E is made correctly. Consequently, the detection performance can be enhanced.

According to the aforementioned embodiments, the steering apparatus 120 includes a sensor electrode substrate 140, 140G, 140H, 140I including a wire layer 141, 141G, 141H, 141I configured to function as the second electrode 132.

According to the above-described configuration, the assembly performance onto the steering 101 is enhanced, thereby to reduce the costs.

According to the aforementioned embodiments, the second electrode 132F includes a function as a heating element 160.

According to the above-described configuration, the steering 101 to which the second electrode 132F is provided can be heated effectively.

According to the aforementioned embodiments disclosed here, the mountability may be enhanced.

The principles, preferred embodiments and modes of operation of the present invention have been described in the foregoing specification. However, the invention which is intended to be protected is not to be construed as limited to the particular embodiments disclosed. Further, the embodiments described herein are to be regarded as illustrative rather than restrictive, Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby).

The invention claimed is:

1. A steering apparatus comprising:
a steering structure including an outer surface;
a surface cover covering the outer surface; and
a conductive function member arranged along an extension direction of the steering structure,
wherein the conductive function member includes a function as a sensor electrode of a capacitance sensor,
wherein the sensor electrode of the capacitance sensor includes:
a first electrode connected to a detection circuit; and
a second electrode provided to be disconnected from the detection circuit and to be independent from the first electrode, the second electrode configured to be electrostatically connected to the first electrode,
wherein the second electrode is formed on a substrate and includes a layer of printed wiring, and
wherein the layer of printed wiring corresponds to a substantially plate-shaped entire-surface wiring.

2. The steering apparatus according to claim 1, wherein the conductive function member includes a function as a heating element.

3. The steering apparatus according to claim 1, wherein the first electrode and the second electrode are arranged to overlap with each other in a radial direction of an orthogonal cross section of the steering structure, and the orthogonal cross section is orthogonal to the extension direction of the steering structure.

4. The steering apparatus according to claim 3, wherein a non-overlapping first electrode region is set at the first electrode, the first electrode does not overlap with the second electrode in the non-overlapping first electrode region.

5. The steering apparatus according to claim 3, wherein a non-overlapping second electrode region is set at the second electrode, the second electrode does not overlap with the first electrode in the non-overlapping second electrode region.

6. The steering apparatus according to claim 3, wherein the first electrode includes a plate-shaped portion provided at least in an overlapping region in which the first electrode overlaps with the second electrode, the plate-shaped portion is arranged to be parallel to the second electrode.

7. The steering apparatus according to claim 1, wherein the sensor electrode of the capacitance sensor is arranged at an inner side of the surface cover.

8. The steering apparatus according to claim 1, wherein the first electrode corresponds to a wire harness.

9. The steering apparatus according to claim 1, wherein the second electrode includes a slit corresponding to a cutout formed at a peripheral edge portion of the second electrode.

10. The steering apparatus according to claim 1, wherein the second electrode includes a function as a heating element.

11. A steering apparatus comprising:
a steering structure including an outer surface;
a surface cover covering the outer surface; and
a conductive function member arranged along an extension direction of the steering structure,
wherein the conductive function member includes a function as a sensor electrode of a capacitance sensor,
wherein the sensor electrode of the capacitance sensor includes:
a first electrode connected to a detection circuit; and
a second electrode provided to be disconnected from the detection circuit and to be independent from the first electrode, the second electrode configured to be electrostatically connected to the first electrode,
wherein the second electrode is formed on a substrate and includes a layer of printed wiring, and
wherein the layer of printed wiring includes a grid pattern.

12. The steering apparatus according to claim 11, wherein the conductive function member includes a function as a heating element.

13. The steering apparatus according to claim 11, wherein the first electrode and the second electrode are arranged to overlap with each other in a radial direction of an orthogonal cross section of the steering structure, and the orthogonal cross section is orthogonal to the extension direction of the steering structure.

14. The steering apparatus according to claim 13, wherein a non-overlapping first electrode region is set at the first electrode, the first electrode does not overlap with the second electrode in the non-overlapping first electrode region.

15. The steering apparatus according to claim 13, wherein a non-overlapping second electrode region is set at the second electrode, the second electrode does not overlap with the first electrode in the non-overlapping second electrode region.

16. The steering apparatus according to claim 13, wherein the first electrode includes a plate-shaped portion provided at least in an overlapping region in which the first electrode overlaps with the second electrode, the plate-shaped portion is arranged to be parallel to the second electrode.

17. The steering apparatus according to claim 11, wherein the sensor electrode of the capacitance sensor is arranged at an inner side of the surface cover.

18. The steering apparatus according to claim 11, wherein the first electrode corresponds to a wire harness.

19. The steering apparatus according to claim 11, wherein the second electrode includes a slit corresponding to a cutout formed at a peripheral edge portion of the second electrode.

20. The steering apparatus according to claim 11, wherein the second electrode includes a function as a heating element.

* * * * *